Patented Feb. 8, 1949

2,461,220

UNITED STATES PATENT OFFICE 2,461,220

SEPARATION OF POLYHYDRIC ALCOHOLS

Eugene J. Lorand, Wilmington, Del., assignor to Hercules Powder Company, Wilmington, Del., a corporation of Delaware No Drawing. Application March 14, 1947,
Serial No. 734,881

8 Claims. (Cl. 260—637)

This invention relates to the separation of the lower polyhydric alcohols from a mixture of polyhydric alcohols, more particularly to the separation of polyhydric alcohols containing from 2 to 4 carbon atoms from such a mixture, and still more particularly to the separation of glycol and glycerol from such a mixture.

So far as I am aware, there is no prior art directly relating to this invention. There is, however, abundant literature on the direct recovery of glycerol from concentrated glycerol-fermented mash or wort, or from distillers' slop or other aqueous glycerol solutions or concentrates. In all of these cases, the problem is the recovery of glycerol alone which is the only polyhydric alcohol which is present in substantial quantities in the mash or slop, etc. The instant problem is essentially different and involves the separation of one or more lower polyhydric alcohols from an admixture of a large number of polyhydric alcohols, such as are obtained from the hydrogenation of formaldehyde condensates.

The object of this invention is to provide a process for the separation of polyhydric alcohols, and more particularly to provide a process for the separation of the lower polyhydric alcohols, such as glycol and glycerol, from the higher ones, such as the pentitols and the hexitols. One possible simple method of separation of lower polyhydric alcohols from a mixture containing higher ones appears to be that of fractional distillation at reduced pressures. But here very low pressures must be used to avoid decomposition of the non-volatile polyhydric alcohols, and the process cannot be said to be feasible. Then again, hydrogenated formaldehyde condensation products usually contain certain acetal-type derivatives of polyhydric alcohols, the exact composition of which is not known, which upon decomposition yield compounds of the furfural type. This decomposition takes place at low pressures and the products of the reaction have boiling points close to those of glycol and glycerol. Hence the isolation of the latter is rather difficult.

It is a further object of this invention to effect the separation of polyhydric alcohols, and in particular, the isolation of the lower polyhydric alcohols without decomposition and the accompanying contamination of the yield by decomposition products.

Other objects and advantages of this invention will appear by reference to the following specification.

In accordance with this invention, a mixture of polyhydric alcohols is brought into contact with an organic solvent which selectively dissolves the alcohols of lower molecular weight; the liquids are agitated; the resultant layer containing the major portion of the solvent is separated; and the alcohols are recovered by distilling off the solvent at reduced pressure.

The processes embodying my invention are particularly adapted for removing polyhydric alcohols of lower molecular weight from mixtures of polyhydric alcohols obtained in the hydrogenation of formaldehyde condensation products. When such condensation products are subjected to catalytic hydrogenation under high pressure, a mixture of polyhydric alcohols ranging from those containing 2, to those containing 6 carbon atoms or more results. Processes have been devised to so conduct the condensation of formaldehyde, that mainly the lower sugars are formed, the hydrogenation of which then yields a polyhydric alcohol mixture with the lower members of the series predominating. However, even here there are some of the higher polyhydric alcohols such as pentitols, and the hexitols.

In accordance with this invention, I have found that a cyclic ether of the group consisting of dioxan, 1,3-dioxan, dioxolane, monomethyl dioxan, dimethyl dioxan, ethyl dioxan, and mixtures thereof dissolve polyhydric alcohols of 2 to 4 carbon atoms but have little or no solvency for polyhydric alcohols of more than 4 carbon atoms. Ordinary dioxan (also known as dioxane, 1,4-dioxan, diethylene dioxide, p-dioxan, or glycol ethylene ether) is the most economically available member of the group and is for that reason preferred. However, instead of ordinary dioxan (1,4-dioxane) there may be used 1,3-dioxan which is also known as m-dioxan or as trimethylene methylene dioxide. Other cyclic ethers which have been found effective in the process are, for example, dioxolane (also known as ethylene glycol methylene ether or ethylene methylene dioxide), monomethyl dioxan (also known as propylene ethylene dioxide), dimethyl dioxan (also known as dipropylene dioxide, trimethylene glycol trimethylene ether), and ethyl dioxan. It will be understood that the cyclic ether utilized will dissolve the polyhydric alcohols of 2 to 4 carbon atoms without dissolving higher polyhydric alcohols. It is desirable that the cyclic ether be volatile, in any case, more volatile than ethylene glycol in order that ethylene glycol and glycerin extracted thereby may be readily separated by a distillation procedure.

The cyclic ethers vary slightly among themselves in their specific solvent properties. Thus dioxolane dissolves ethylene glycol, glycerol and erythritol in the cold and is best used in the cold since upon warming it has an appreciable solvent action on polyhydric alcohols of more than 4 carbon atoms. Ordinary dioxan and 1,3-dioxan dissolve glycol in the cold, dissolve glycerol and erythritol when hot but retain the latter two compounds to an appreciable extent upon cooling, especially in the presence of a small amount of glycol. They have little or no solvent power for the higher polyhydric alcohols, especially in the cold. Methyl dioxan, ethyl dioxan and other members of the group having more carbon atoms than dioxan, have a smaller solvent power for the polyhydric alcohols having more than 4 carbon atoms and also have relatively little solvent power for erythritol. In most cases, they dissolve glycerol only when heated. Thus, by selection of the proper solvent, extracts rich in ethylene glycol but relatively poor in glycerol can be obtained, or extracts containing substantially all the ethylene glycol and glycerol and some erythritol in a mixture may be obtained.

In carrying out the method according to this invention, a mixture of polyhydric alcohols, such as, for example, a hydrogenated formaldehyde condensate is mixed with a quantity, for example an equal volume, of the cyclic ether utilized as the extractant. I have found that it is advisable to operate with a large excess of solvent, for inasmuch as the polyhydric alcohols are mutually soluble, their solubility in a given solvent is influenced by the presence of other alcohols of the group. The mixing is preferably carried out by agitation in any suitable vessel with or without the application of heat, although any method of bringing the two fluids into intimate contact is satisfactory. Thorough agitation is desirable. After the two liquids have been in intimate contact, the mixture is permitted to stand until a separation into two phases takes place. The extract phase containing the lower polyhydric alcohols and the major portion of the cyclic ether is then removed from the other phase as by decantation. The polyhydric alcohols of 2 to 4 carbon atoms may then be recovered by distilling off the cyclic ether. In most cases, this extractive procedure will be repeated several times so that the mixture of polyhydric alcohols is exposed to the action of a large excess of cyclic ether. Since the common solvent effect of the various polyhydric alcohols in a mixture somewhat interfere with the extraction process, it is usually desirable to start the extraction at a lower temperature and to raise the temperature gradually in successive extraction steps as increasing amounts of lower polyhydric alcohols have been eliminated.

The following examples are illustrative of the methods hereinbefore described, and it is, of course, to be understood that my invention is not to be limited to the specific details of the examples described.

*Example 1*

A mixture of polyhydric alcohols was prepared with the following composition.

| | Parts by weight |
|---|---|
| Glycol (2 carbon atoms) | 25 |
| Glycerol (3 carbon atoms) | 20 |
| Erythritol (4 carbon atoms) | 15 |
| Xylitol (5 carbon atoms) | 20 |
| Sorbitol (6 carbon atoms) | 20 |
| | 100 |

Two hundred parts by weight of the above mixture was subjected to progressive extraction with dioxan. About 103 parts by weight of dioxan (1,4-dioxan) was added to the mixture and the whole agitated for about 1 hour. The liquid was then decanted and the residue treated with fresh dioxan. As the polyhydric alcohol mixture was completely soluble in hot dioxan due to the common solvent effect of the relatively large proportion of glycol present, the first three extractions were carried out at 22° C. In this way, enough glycol was removed from the mixture to make warm extraction possible, i. e., to obtain a good separation into two layers after treatment of the mixture with hot dioxan. Five extractions were thus made at 80° C. The decanted solutions were allowed to cool to precipitate part of the polyhydric alcohols. By evaporating the solvent from the residual liquids, the extracts were determined. The following table shows the progress of the extraction:

| Extract No. | Solution Withdrawn | Precipitate on Cooling | | Soln. Left | Extract in Cold Soln. | |
|---|---|---|---|---|---|---|
| | | Total | Per 100 parts of Soln. | | Total | Per 100 parts of Soln. |
| 1 | 70.1 | | | | 10.9 | 15.3 |
| 2 | 83.2 | | | | 4.4 | 5.3 |
| 3 | 138.2 | | | | 6.9 | 5.0 |
| 4 | 135.1 | 12.5 | 9.3 | 120.1 | 18.4 | 15.4 |
| 5 | 108.2 | 8.1 | 7.6 | 93.7 | 7.0 | 7.5 |
| 6 | 137.8 | 8.9 | 6.5 | 126.9 | 7.1 | 5.6 |
| 7 | 123.1 | 7.5 | 5.8 | 113.8 | 5.7 | 5.1 |
| 8 | 107.3 | 3.0 | 2.8 | 100.2 | 4.7 | 4.7 |
| | | 40.0 | | | 65.1 | |

(Amounts are in parts by weight)

With reference to the above table, it will be seen that the total precipitate of 40 parts plus the total extract of 65.1 parts gave 105.1 parts. Since the original mixture of 100 parts contained 60 parts by weight of the lower polyhydric alcohols (2 to 4 carbon atoms), the two hundred parts of the original mixture contained 120 parts by weight of the lower polyhydric alcohols. Thus, it is seen that 105.1 parts by weight of substantially pure lower polyhydric alcohols were recovered from the mixture subjected to extraction and in which 120 parts by weight of the lower polyhydric alcohols were present. This is a recovery in the order of 87% of substantially pure lower polyhydric alcohols. The lower polyhydric alcohols recovered were readily identifiable from the higher polyhydric alcohols since both the precipitate (which was formed on cooling the extraction liquors) and the extract recovered from the cold solution were liquids, while the extraction residue (after removing solvents) was a partially crystallized semisolid. The enormous difference in viscosities showed that the extracts consisted almost entirely of the lower polyhydric alcohols, while the higher ones (xylitol and sorbitol) composed the residue.

*Example 2*

The procedure of Example 1 was repeated using dioxolane instead of the dioxan. However all extractions were carried out at a temperature of 20° C. The extracts were combined and the dioxolane removed by distillation as in this manner 59 parts by weight of lower polyhydric alcohols were obtained per 100 parts by weight of the original mixture of polyhydric alcohols.

*Example 3*

The procedure of Example 1 was repeated using dimethyl dioxan (mixture of 2-methyl 6-methyl-1,4-dioxan and 2-methyl-5-methyl-1,4-dioxan). The extracts were combined and the dimethyl dioxan distilled therefrom to obtain, per 100 parts by weight of the original mixture of polyhydric alcohols, a total of 57.3 parts by weight of a mixture consisting essentially of glycol and glycerol.

If desired, the processes herein described may be carried out continuously. Satisfactory apparatus for such operation includes a deep vessel about six times as high as the diameter of its cross section, jacketed to maintain a constant temperature within. An extractor head fits into the top of the vessel. A bearing which holds a mechanical stirrer is fastened to the uppermost part of the head and extends down to the bottom of the vessel. The stirrer is equipped with a propeller blade which serves to mix intimately the mixture of polyhydric alcohols contained in the vessel and the extracting solvent which is continuously run between the bearing and the stirrer into the bottom of the vessel. This solvent selectively dissolves the alcohols of lower molecular weight, and the resulting solution which is of lower specific gravity than the mixture containing substantially more of the higher polyhydric alcohols slowly rises to the top of the vessel and into the extractor head whence it flows off and is collected.

An even better method is one involving the application of the countercurrent principle. In a packed tower, the polyhydric alcohol mixture follows the path determined by gravity, while the solvent is forced in the opposite direction, so that fresh solvent, at the bottom of the tower, comes into contact with a nearly exhausted mixture, while the nearly saturated solution leaches fresh polyhydric alcohol mixture at the top of the tower. The tower is suitably jacketed so as to insure any temperature desired. With the proper choice of solvent, temperature, rate of flow, etc., complete separation of the lower polyhydric alcohols may be obtained.

It will be understood that in carrying out the process according to this invention, a combination of several solvents may be used instead of a single extracting solvent. The combination may be used either in admixture or one following the other, for example a polyhydric alcohol mixture may first be extracted with dimethyl dioxan or trimethylene glycol trimethylene ether to remove glycol and some glycerol with a minimum extract of erythritol. After removal of the glycol and consequent elimination of its common solvent effect, the glycerol and some quantity of glycol remaining in the polyhydric alcohol mixture may be removed with dioxan or dioxolane which are stronger solvents for glycerol than the first extractant utilizer. Similarly, a polyhydric alcohol mixture may be extracted with dimethyl dioxan or with dioxan and then the mixture remaining may be extracted with hot butanol to remove and recover erythritol.

The process according to this invention provides a practical and economical method of separating the exceedingly similar members of the polyhydric alcohol series. In addition, the extracts are uncontaminated by thermal decomposition products which usually accompany fractions obtained by distillation procedures.

This application is a continuation-in-part of my copending application, Serial Number 478,291, filed March 6, 1943, and now abandoned, which in turn is a continuation-in-part of my Patent No. 2,325,783, Serial Number 355,807, filed September 7, 1940.

What I claim and desire to protect by Letters Patent is:

1. A process for separating polyhydric alcohols containing from 2 to 4 carbon atoms from a mixture containing such polyhydric alcohols in admixture with polyhydric alcohols of more than 4 carbon atoms which comprises bringing the mixture into contact with a cyclic ether of the group consisting of dioxan, 1,3-dioxan, dioxolane, monomethyl dioxan, dimethyl dioxan, ethyl dioxan, and mixtures thereof, permitting a separation into two phases, separating the two phases, and recovering 2 to 4 carbon atom polyhydric alcohols from the phase containing the major portion of the cyclic ether solvent.

2. A process for separating polyhydric alcohols containing from 2 to 4 carbon atoms from a mixture containing such polyhydric alcohols in admixture with polyhydric alcohols of more than 4 carbon atoms which comprises bringing the mixture into intimate contact with 1,4-dioxan, permitting a separation of the resulting mixture into two phases to take place, separating the two phases, and recovering 2 to 4 carbon atom polyhydric alcohols from the dioxan phase.

3. A process for separating polyhydric alcohols containing from 2 to 4 carbon atoms from a mixture containing such polyhydric alcohols in admixture with polyhydric alcohols of more than 4 carbon atoms which comprises bringing the mixture into intimate contact with 1,4-dioxan, permitting a separation of the resulting mixture into two phases to take place, separating the two phases, recovering 2 to 4 carbon atom alcohols from the dioxan phase; bringing the previously extracted polyhydric alcohol mixture into contact with hot 1,4-dioxan at a temperature between about 70° C. and about 90° C., permitting the resulting mixture to form two phases, separating the two phases, cooling the separated dioxan phase to precipitate higher polyhydric alcohols dissolved therein, separating the dioxan phase from the precipitate, and recovering 2 to 4 carbon atom polyhydric alcohols from the resulting cooled dioxan phase.

4. A process for separating glycol and glycerol from a mixture thereof with higher polyhydric alcohols which comprises bringing the mixture into intimate contact with 1,4-dioxan, permitting a separation of the resulting mixture into two phases to take place, separating the two phases, recovering glycol and glycerol from the dioxan phase; bringing the previously extracted mixture into intimate contact with hot 1,4-dioxan at a temperature between about 70 C. and about 90° C., permitting separation of the resulting mixture into two phases to take place, separating the two phases, cooling the dioxan phase to precipitate higher polyhydric alcohols therein, separating the dioxan phase from the precipitate, and recovering glycol and glycerol from the cooled dioxan phase.

5. A process for separating polyhydric alcohols containing from 2 to 4 carbon atoms from a mixture containing such polyhydric alcohols in admixture with polyhydric alcohols of more than 4 carbon atoms which comprises bringing the mixture into contact with a cyclic ether of the group consisting of dioxan, 1,3-dioxan, dioxolane, monomethyl dioxan, dimethyl dioxan, ethyl dioxan, and mixtures thereof, countercurrently flowing the cyclic ether solvent and the polyhydric alcohol mixture while in contact with each other, separating the resulting solvent phase from the resulting polyhydric alcohol mixture phase and recovering polyhydric alcohols of 2 to 4 carbon atoms from the cyclic ether solvent phase.

6. A process for separating polyhydric alcohols containing from 2 to 4 carbon atoms from a mixture containing such polyhydric alcohols in admixture with polyhydric alcohols of more than 4 carbon atoms which comprises bringing the mixture into contact with 1,4-dioxan, countercurrently flowing the polyhydric alcohol mixture and the dioxan while in contact with each other, separating the resulting dioxan phase and the resulting polyhydric alcohol mixture phase, and recovering polyhydric alcohols of 2 to 4 carbon atoms from the dioxan phase.

7. A process for separating polyhydric alcohols containing from 2 to 4 carbon atoms from a mixture containing such polyhydric alcohols in admixture with polyhydric alcohols of more than 4 carbon atoms which comprises bringing the mixture into intimate contact with dimethyl dioxan, permitting a separation of the resulting mixture into two phases to take place, separating the two phases, and recovering 2 to 4 carbon atom polyhydric alcohols from the dimethyl dioxan phase.

8. A process for separating polyhydric alcohols containing from 2 to 4 carbon atoms from a mixture containing such polyhydric alcohols in admixture with polyhydric alcohols of more than 4 carbon atoms which comprises bringing the mixture into intimate contact with dioxolane, permitting a separation of the resulting mixture into two phases to take place, separating the two phases, and recovering 2 to 4 carbon atom polyhydric alcohols from the dioxolane phase.

EUGENE J. LORAND.

REFERENCES CITED

The following references are of record in the file of this patent:

FOREIGN PATENTS

| Number | Country | Date |
| --- | --- | --- |
| 525,315 | Great Britain | Aug. 26, 1940 |
| 667,988 | Germany | Nov. 24, 1938 |